March 27, 1962 W. TANNENBAUM ET AL 3,027,425

MAGNETIC RECORDING SYSTEM

Filed Oct. 24, 1957 7 Sheets-Sheet 1

INVENTORS.
WESLEY TANNENBAUM.
ELLIS HUDES.
ALFRED LEONARD GOLDSTEIN
BY Alden D. Redfield
Irwin P. Garfinkle
ATTORNEYS.

INVENTORS.
WESLEY TANNENBAUM.
ELLIS HUDES.
ALFRED LEONARD GOLDSTEIN
BY Alden D. Redfield
Irwin P. Garfinkle
ATTORNEYS.

INVENTORS.
WESLEY TANNENBAUM.
ELLIS HUDES.
ALFRED LEONARD GOLDSTEIN
BY Alden D. Redfield.
Irwin P. Garfinkle
ATTORNEYS.

INVENTORS.
WESLEY TANNENBAUM.
ELLIS HUDES.
ALFRED LEONARD GOLDSTEIN
BY Alden D. Redfield.
Irwin P. Garfinkle
ATTORNEYS.

INVENTORS.
WESLEY TANNENBAUM.
ELLIS HUDES.
ALFRED LEONARD GOLDSTEIN
BY Alden D. Redfield
Irwin P. Garfinkle
ATTORNEYS.

INVENTORS.
WESLEY TANNENBAUM.
ELLIS HUDES.
ALFRED LEONARD GOLDSTEIN
BY Alden D. Redfield
Irwin P. Garfinkle
ATTORNEYS.

INVENTORS.
WESLEY TANNENBAUM.
ELLIS HUDES.
ALFRED LEONARD GOLDSTEIN,
BY Alden D. Redfield
Irwin P. Garfinkle
ATTORNEYS.

United States Patent Office 3,027,425

Patented Mar. 27, 1962

3,027,425

MAGNETIC RECORDING SYSTEM

Wesley Tannenbaum, Bedford, Ellis Hudes, Framingham, and Alfred Leonard Goldstein, Bedford, Mass., assignors to Avco Manufacturing Corporation, Cincinnati, Ohio, a corporation of Delaware Filed Oct. 24, 1957, Ser. No. 692,960

21 Claims. (Cl. 179—15.55)

This invention relates to tape recording apparatus generally, and particularly to tape recording equipment which is capable of compressing audio messages for transmission in short bursts and for expanding received messages for normal audio playback.

In recent years extensive investigations have been conducted on the method of communication based on scatter propagation. One method investigated has been transmission and reception of radio waves by reflection from meteor trails. The investigations have revealed that millions of tiny meteors are constantly rushing towards earth at speeds up to sixty or more miles per second, and are burned up somewhere between fifty and eighty miles above the earth's surface. If a short-wave radio signal beamed into space strikes the ionized trail of a burned meteor, it is reflected; and if the particular meteor trail is positioned so as to return the wave to earth within the reception area of a receiving station, an avenue of communication is created. The period during which a single meteor serves as a deflecting medium is relatively short; experience has indicated, however, that transmission paths will be established in short intervals by random meteor trails appearing three to five percent of the total time.

In order that one hundred percent transmission be permitted, messages are compressed in time by means of a tape recorder which records messages at a low speed and then transmits the same message at a very high speed. For example, in a working embodiment of our invention, low tape speeds of 5, 2½ and 1⅔ inches per second are selectively used, and the messages are then transmitted at a tape speed of 250 inches per second. The transmitted, compressed message is again recorded at the high speed at a remote receiver location and later is converted into an intelligible audio message by playing back at the original low recording speed. Means are provided for automatically and simultaneously operating both the receiver and the transmitter only when a meteor path is established between stations and, thus, one hundred percent message transmission can be accomplished during the short intermittent periods when a meteor trail is established.

In order to operate the units simultaneously, and only during those times when a meteor path is established, each station continuously transmits unmodulated signals and has its own receiver tuned to the other station's transmitter. In the absence of a meteor trail, no signals get through. When a trail does appear, each station receives the other's signals and this triggers each station to transmit a "start" signal. Receipt of the "start" signal triggers each station to start its high-speed transmission and to record the broadcast from the other station. When the received signals drop below a pre-set minimum, indicating that the meteor trail is playing out, both stations transmit "stop" pulses and shut off their transmission and return to stand-by condition to await the next meteor. Since our invention is restricted to the tape recording apparatus and circuits, the system for triggering the operation of the units is not included herein; however, a suitable triggering system is described in an article by Philip J. Klass in Aviation Week, June 17, 1957, page 96 et seq.

Although this invention finds utility in connection with meteor transmission, it is in no way limited thereto; and provision has been made so that the apparatus may be used in any communications system where compressed message transmission is deirable. For example, the system may be used in a usual radio communications channel or in a telephone system during periods when the channels or lines are overcrowded, the compressed messages being stored until time permits playback. Since our invention is limited to the recorders, per se, the transmitting and receiving systems are not included herein, but any suitable system may be employed.

It is the object of this invention to provide an improved tape recorder system for compressing messages at a transmitter and for expanding messages at the receiver end of the system; for instantaneously starting and stopping the expander and compressor units at the same time; and for operating both units with minimum loss of power during the stand-by periods. This invention also provides apparatus enabling compression ratios far in excess of those used in the prior art and which uses the maximum message time available on a given length of tape.

It is another object of this invention to provide a magnetic tape recorder designed for operation in conjunction with a transmitter receiver system and by means of which speech may be time-compressed for transmission and expanded upon reception for audio playback.

Another object of this invention is to provide a magnetic recording system capable of highly compressing recorded speech for playback and transmission.

Another object of this invention is to provide a magnetic tape recorder in which means have been provided for removing and for preventing the accumulation of static electricity on the tape, thereby permitting very fast tape speeds.

Still another object of this invention is to provide a magnetic tape recording system which is capable of instantaneous acceleration to the proper recording speed, and instantaneous stopping.

A still further object of this invention is to provide a continuously rotating drive for an endless magnetic tape, and means for engaging the drive and the tape to accelerate the tape to the recording speed instantaneously.

Another object of this invention is to provide a constantly rotating drive for a magnetic tape, and means for instantaneously engaging the drive with the tape for rapidly accelerating the tape, and means for instantaneously releasing the drive from the tape and simultaneously applying a brake to the tape for instantaneous stopping.

Another object of this invention is to provide a tape recording system having bias and erase oscillators which are operative only during recording periods.

Briefly described, our invention consists of a multistation communications system, each station having a transmitter and a receiver and two tape recorder units. One tape recording unit is called a compressor and is designed to operate in conjunction with the transmitter, and the other unit, called an expander, is designed to operate in conjunction with the receiver. In the context of this disclosure the terms "compressor" and "expander," etc., are used to designate apparatus in which intelligence is time-compressed or time-expanded.

The compressor is designed for recording speech on a magnetic tape at a low speed and then for playing back the recorded message at a very high speed for transmission to the receiving station. The playback speeds may range from fifty to one hundred fifty times the recording speed, and in this way a message of fifteen minutes' duration may be transmitted in as little time as six seconds. The expander is designed for recording the transmitted compressor messages at the same high speed and for subsequent playback at the original low recording speed. In this way the compressed speech is expanded in time back to its original and understandable audio form.

For a more complete understanding of the nature and other objects of our invention, reference should now be made to the following detailed description and to the accompanying drawings, in which.

Figure 1:
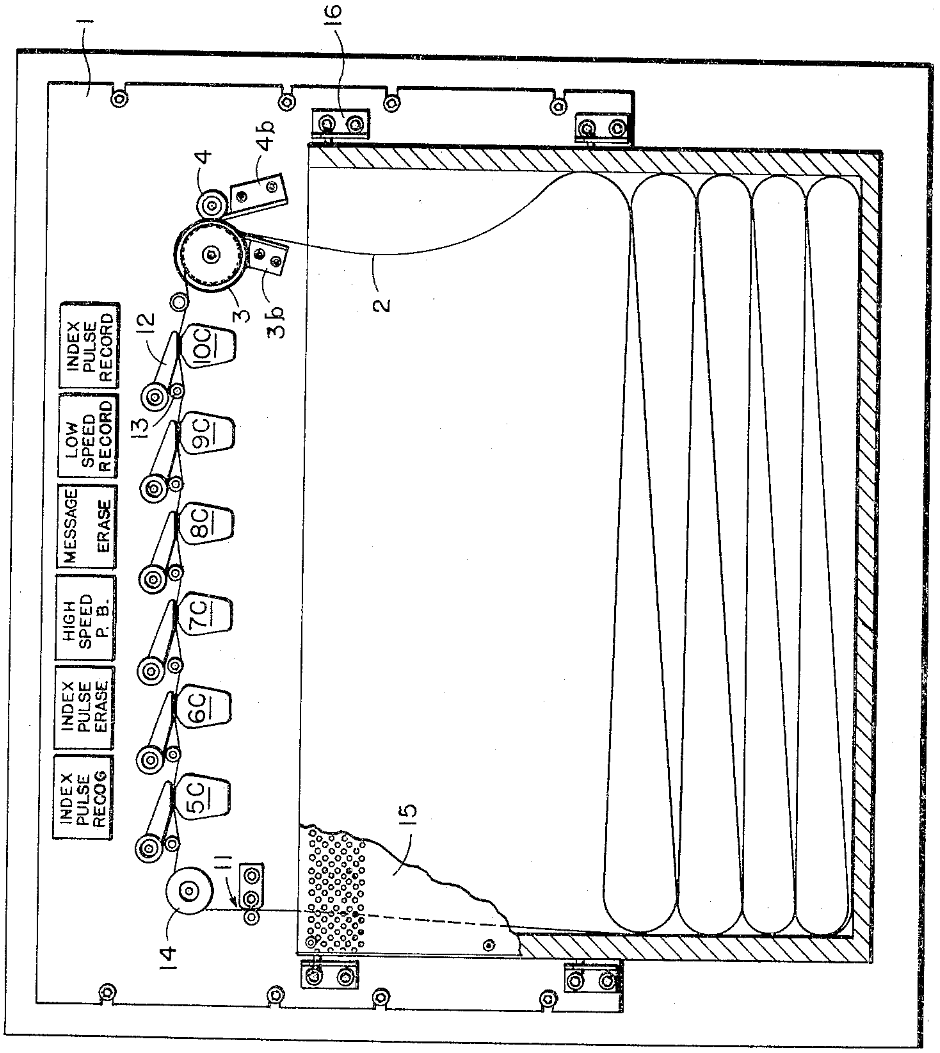
FIG. 1 is a front view of the compressor unit showing the arrangement of the magnetic heads and the magnetic tape.

The compressor unit is illustrated in FIG. 1. Except for the order and use of the magnetic heads, the mechanical arrangement of the expander is identical with the compressor and, for simplification, is not duplicated. The compressor requires six magnetic heads mounted on the front panel 1 of the transmitter, and over which a magnetic tape 2 is arranged to be driven. The magnetic tape 2 used in the system consists of an endless, very lightweight tape which is formed by fastening together the ends of a desired length. For a purpose to be more fully explained, we employ both of the channels or tracks of a standard ¼" tape, one for audio signals or messages and the second for indexing pulses.

The tape 2 is driven by means of a continuously rotating capstan 3 in conjunction with a solenoid-actuated idler 4. The capstan and idler are ordinarily separated so that there is no friction between the capstan and the tape. However, when the idler engages the capstan with the tape therebetween, the tape is instantly driven at the capstan speed. Since the capstan is arranged to rotate in a clockwise direction, a given point on the tape will move across the magnetic heads from left to right, as viewed in FIG. 1.

The six magnetic heads of the compressor include an index pulse recognition head 5C, an index pulse erase head 6C, a high-speed playback head 7C, a message erase head 8C, a low-speed record head 9C and an index pulse record head 10C. Also provided is a solenoid-actuated brake mechanism 11 for instantaneously stopping the movement of the tape when the idler is disengaged from the capstan. In addition, the tape is maintained against the magnetic heads by means of spring-loaded pressure plates or pads 12 and, although the braking action is only momentary, the frictional force of the pressure pads and the weight of the stored tape prevent the tape from creeping. A series of guides 13 and end turning post 14 insure proper tape alignment.

A bin 15 is mounted below the tape travel mechanism for storing slack tape. Preferably, the bins are constructed of 16 gauge perforated steel, the perforations comprising at least forty percent of the wall area. The bin has height sufficient to contain the slack tape when formed into loops as it travels past the capstan 3, a width approximately equal to the distance between the capstan 3 and the turning post 14, and a depth approximately equal to the width of the magnetic tape 2. The bin is mounted from the front panel by means of brackets 16 and is easily removed for facilitating tape replacement. For a purpose hereinafter to be explained, the inside surfaces of the bin are coated with a very fine film of lubricating oil.

Figure 2:
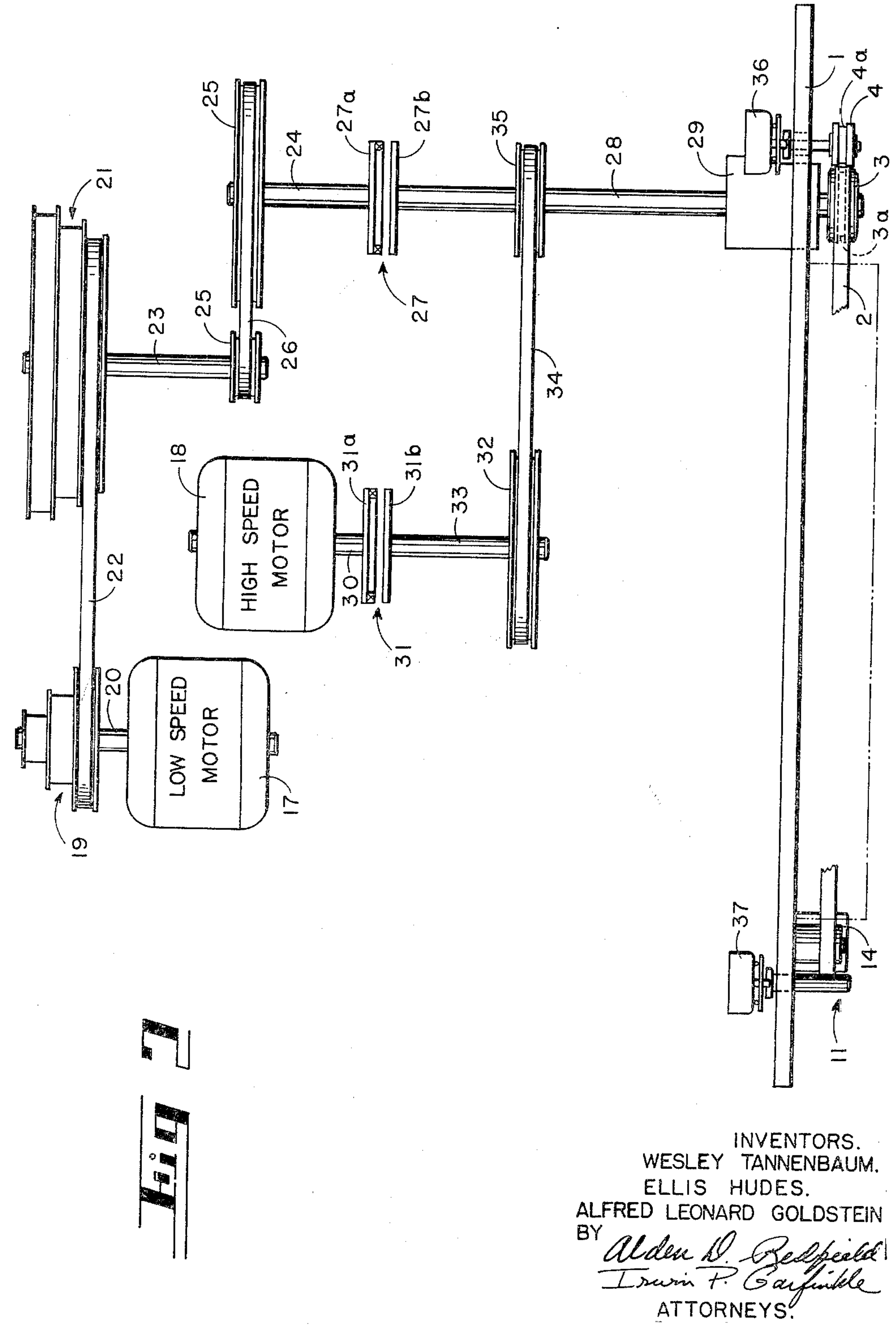
FIG. 2 is a schematic diagram of the high speed and low speed drive mechanisms for the magnetic tape.

FIG. 2 is a schematic representation of the identical tape drive mechanisms of the compressor and the expander as would be viewed from the top of the units. The drive mechanisms are each comprised of a low-speed motor 17 and a high-speed motor 18 which are selectively coupled by means of pulleys and clutches to the capstan 3. A 3-step pulley assembly 19 is fixedly mounted to the shaft 20 of the low-speed motor 17, and is coupled to a second 3-step pulley assembly 21 by means of an endless belt 22. The 3-step pulley assemblies are provided for the purpose of permitting three different recording speeds and, hence, enable selection of any one of three compression ratios. The 3-step pulley 21 is fixedly mounted on a shaft 23 which is, in turn, coupled to a shaft 24 by means of the pulleys 25 and the belt 26.

The shaft 24 is coupled directly to the driving element 27*a* of a low-speed magnetic clutch 27, and the driven element 27*b* is coupled by means of a shaft 28 which is supported in bearings 29 directly to the capstan 3. The shaft 30 of the high-speed motor 18 is directly coupled to the driving element 31*a* of a high-speed magnetic clutch 31, and the driven clutch element 31*b* and a pulley 32 are fixedly coupled on a shaft 33. The pulley 32 is coupled by means of an endless belt 34 to a pulley 35 fixedly mounted on a shaft 28.

The low-speed motor 17 and the high-speed motor 18 are continuously energized during operation of the apparatus and, therefore, the driving elements 27*a* and 31*a* of the low-speed and the high-speed clutches are continuously rotated. Moreover, the clutches 27 and 31 are arranged so that one or the other is operative at all times, thereby causing the continuous rotation of the capstan at either the high speed or one of the preselected low speeds.

When it is desired to record or monitor a message in the compressor or to play back in the expander, appropriate pulleys in the assemblies 19 and 21 are preselected, the clutch 27 is engaged and the idler 4 is driven against the capstan 3 by means of a rotary-type solenoid 36 to frictionally engage and drive the tape 2 across the six magnetic heads. Upon appropriate signals and when it is desired to stop the movement of the tape, the idler 4 is released from the capstan 3 and the brake mechanism 11 is momentarily activated by means of a similar rotary-type solenoid 37 to instantly stop the movement of the tape. The friction of the pressure plates 12 is sufficient to prevent the tape from creeping on the rotating capstan 3. When it is desired to transmit a message from the compressor and to record it in the expander, the operation is the same except that the magnetic clutches 31 are engaged. Although not illustrated, it appears obvious that simple circuitry coupled with the switches in the various pulse networks to be described, can be employed for the automatic operation of the clutches 27 and 31.

The mechanical arrangement described to this point constitutes several major advantages over the prior art. First, the continuously rotating capstan 3 of the tape drive mechanism permits instantaneous acceleration of the magnetic tape to full speed. Second, the momentary brake mechanism 11, coupled with the pressure plates, insures instantaneous and complete stopping.

Still another major improvement resides in the construction of the pressure plates 12. It has been common practice in prior art to employ felt pads at the ends of the pressure plates for the purpose of conforming the tape to any irregularities in the surfaces of the magnetic heads.

In the prior art apparatus it was noted that tape speeds were greatly limited, due to the fact that the tape tended to cling to the sides of the bin. Investigation revealed that the clinging was due to an accumulation of large amounts of static electricity on the tape; it was also discovered that the major source of static electricity was the felt pads used in conjunction with the pressure plates. In accordance with one feature of our invention, the felt pads have been removed, and pressure plates constructed entirely of a conducting metal have been used to maintain the contact between the magnetic tape and the magnetic heads.

The result has been a great reduction in the accumulation of static electricity without any noticeable or measurable loss of pickup or ability to record, and much higher tape speeds have been achieved than ever were accomplished in the prior art. Some additional advantage was also gained by lubricating the side walls of the bin, thereby reducing friction betwen the tape and the bin. Because of the very high tape speeds produced, it became necessary to provide the capstan and idler with circumferential grooves 3a and 4a, respectively, and to provide strippers 3b and 4b mounted on the panel 1 and arranged to strip the tape from the rotating elements and direct it into the bin.

Figure 3:
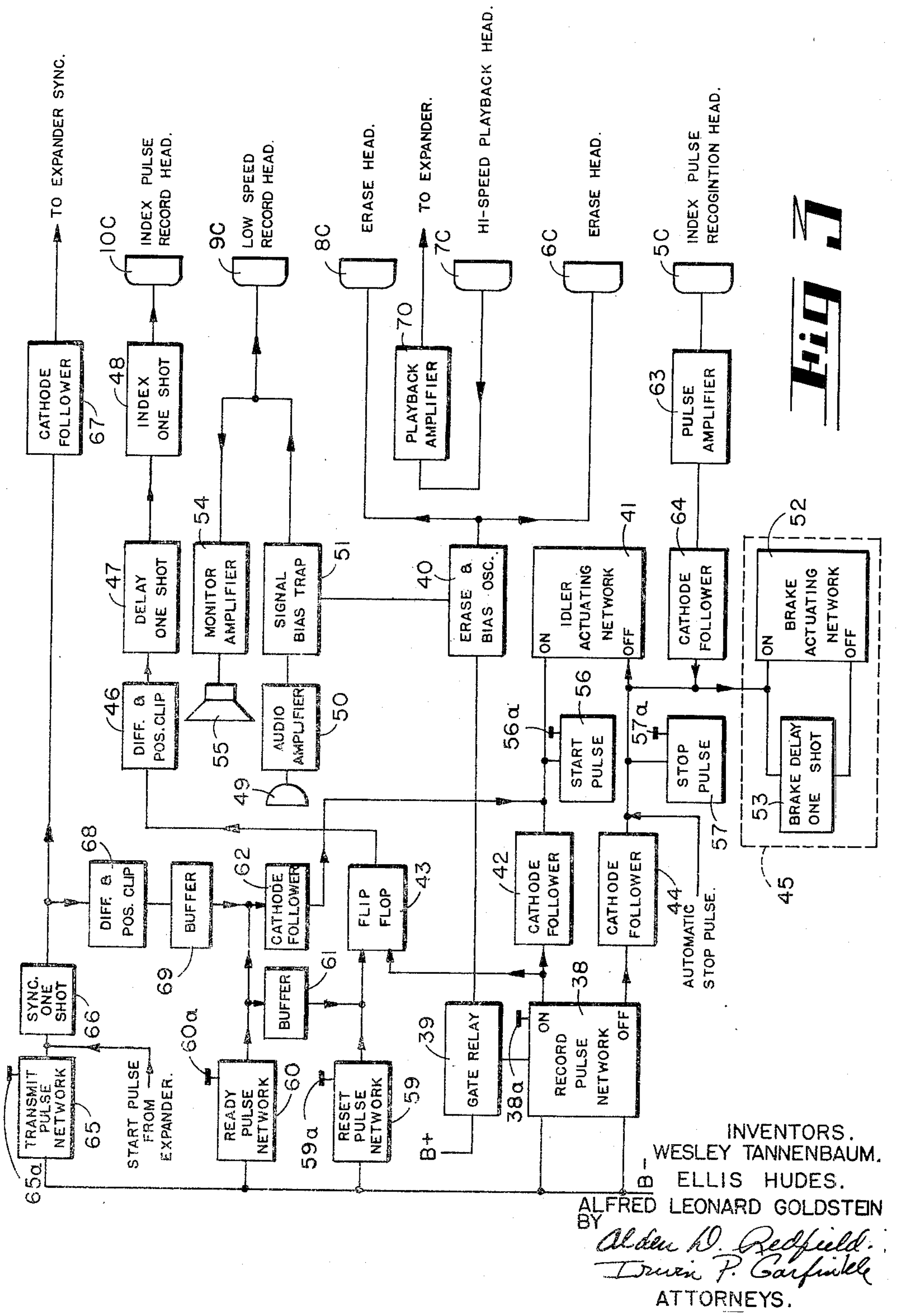
FIG. 3 is a block diagram of the electronic components of the compressor unit.
Figure 4:
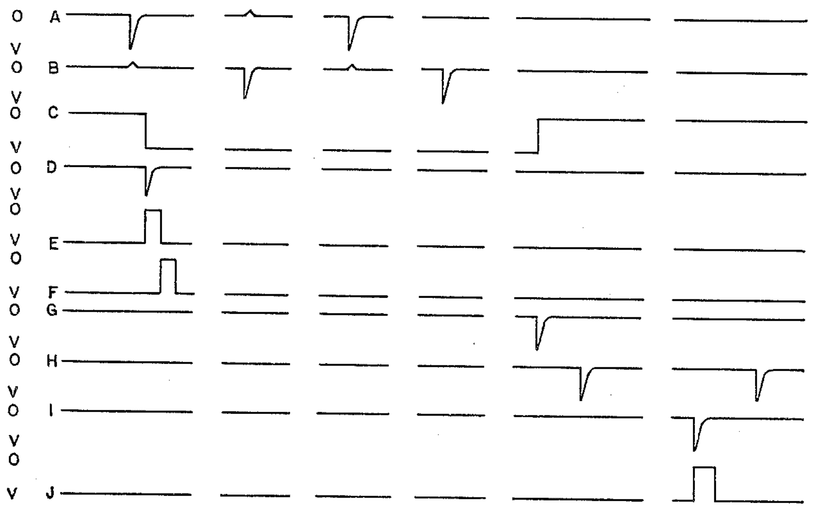
FIG. 4 is a series of curves illustrating the operation of various components of the compressor unit.

The electronic control circuits for the compressor provide for both manual and automatic operations and may be most clearly understood by reference to the block diagram illustrated in FIG. 3 and to the associated curves illustrated in FIG. 4. As was previously indicated, the magnetic tape 2 is arranged to be driven past the six magnetic heads 5C–10C in that order. For the purpose of recording a message, the motors 17 and 18 are started by connection to an appropriate power source; the element of the low-speed clutch is engaged; and the proper recording speed is provided by manual or automatic selection of appropriate pulleys in the assemblies 19 and 21.

Figure 7:
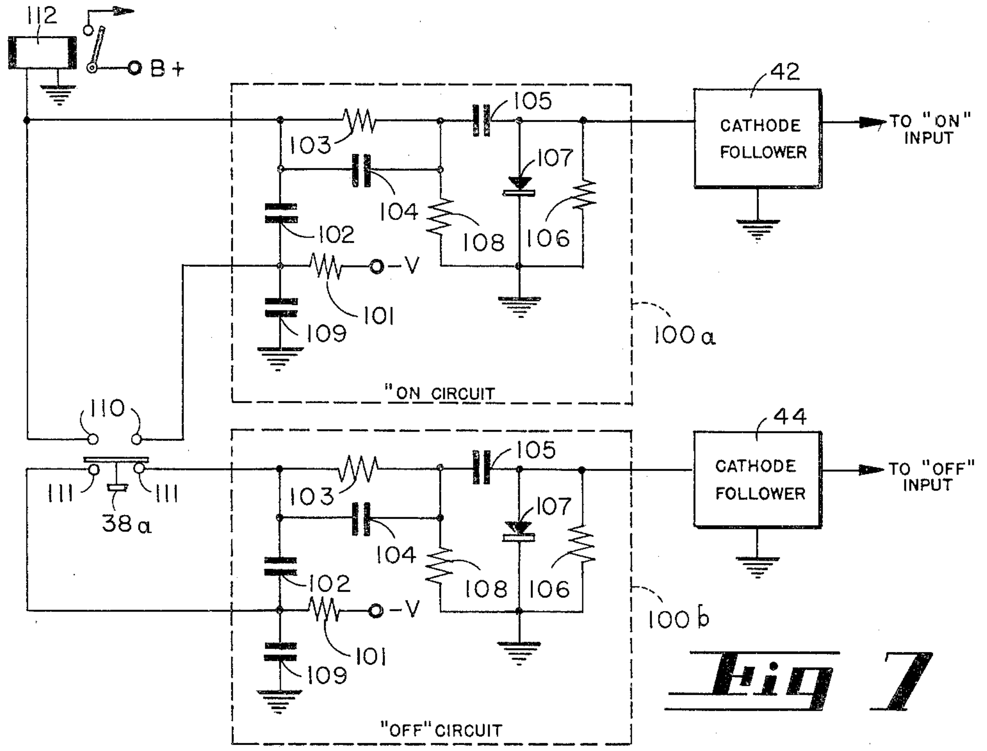
FIG. 7 is a schematic diagram representing pulse networks used in the compressor and expander units.

The electronic circuits of the compressor are arranged to control several required operations of the unit, and for this purpose several similar push button networks are provided for producing control pulses. The first operation is slow-speed recording, and this is controlled by means of negative "on" and "off" pulses produced in record pulse network 38. The network 38, which is representative of each push button circuit, is illustrated in FIG. 7 and will hereinafter be described in detail.

When the push button switch 38a in the record pulse network 38 is depressed, the gate relay circuit 39 is rendered operative to connect the B+ supply to an erase and bias oscillator 40 and, in addition, a negative pulse is produced, as indicated by the curve *a* in FIG. 4, at the "on" circuit of the network 38. Conveniently, the switch 38a may be relay-operated by another switch (not shown) physically located at the microphone. The negative pulse is applied simultaneously to the "on" circuit of an idler-actuating network 41 through a cathode follower amplifier 42, and to the first input of a flip-flop circuit 43. When the push button switch 38a is released, a negative pulse, as illustrated by the curve *b*, is produced at the "off" circuit of network 38, and is applied to the "off" circuit of the idler-actuating network 41 through a cathode follower 44, and to the brake control circuit 45. At the same time the gate relay circuit 39 is rendered inoperative, and the B+ supply is disconnected from the erase and bias oscillator 40.

The negative pulse from the "on" circuit of the record pulse network 38, when applied to the "on" input circuit of the idler-actuating network, serves to activate the idler solenoid 36 and to drive the idler 4 against the capstan 3, thus driving the magnetic tape 2 past the six magnetic heads. When applied to the flip-flop circuit 43, the negative pulse causes the flip-flop to change state, thereby altering its output from a zero voltage to a negative voltage, as indicated by the curve *c* in FIG. 4. This voltage change is then applied to a differentiator and positive clipper 46 to produce a negative pulse, as indicated by the curve *d*. This negative pulse is then applied to a delay one-shot multivibrator 47 which produces a square wave (curve *e*) having a duration equal to the time required for accelerating the tape 2 to the required recording speed. When the square wave output of the one-shot multivibrator 47 falls after the required delay, the voltage drop is differentiated and applied to the index pulse one-shot multivibrator 48 which is thereby fired to produce a relatively wide pulse. This pulse (illustrated as curve *f* in FIG. 4) is then directly recorded as an index pulse on the tape 2 at the index pulse record head 10C.

If an operator now talks into the microphone 49, amplified audio signals from the audio amplifier 50 will be added in a signal and bias trap 51 (hereinafter to be described) with the output from the erase and bias oscillator 40. The resulting signal will then be applied directly to the record head 9C for the recording on the magnetic tape 2.

When the push button switch 38a is released, the negative pulse from the "off" circuit of record pulse network 38 is applied to the "off" input of the idler-actuating network 41 to de-activate the solenoid 36, thereby disengaging the idler 4 from the capstan 3. This negative pulse is also applied to the brake control circuit 45 to momentarily activate the brake solenoid 37 and, thus, momentarily apply the brake mechanism 11 to the tape 2.

The brake control circuit 45 comprises a brake-actuating network 52 having an "on" input and an "off" input, and a brake delay one-shot multivibrator 53 having its input connected to the "on" input circuit and its output connected to the "off" input circuit. The negative pulse from the cathode follower 44, when applied to the brake control circuit 45, simultaneously pulses the "on" input of the brake-actuating network 52 and fires the brake delay one-shot multivibrator 53. Thus, the solenoid 37 is actuated and the brake mechanism 11 is applied to the tape 2. However, at the termination of the one-shot, the voltage drop is differentiated and the resulting pulse is then applied to the "off" input circuit to de-activate the brake solenoid 37 and release the brake 11 from the tape.

Figure 9:
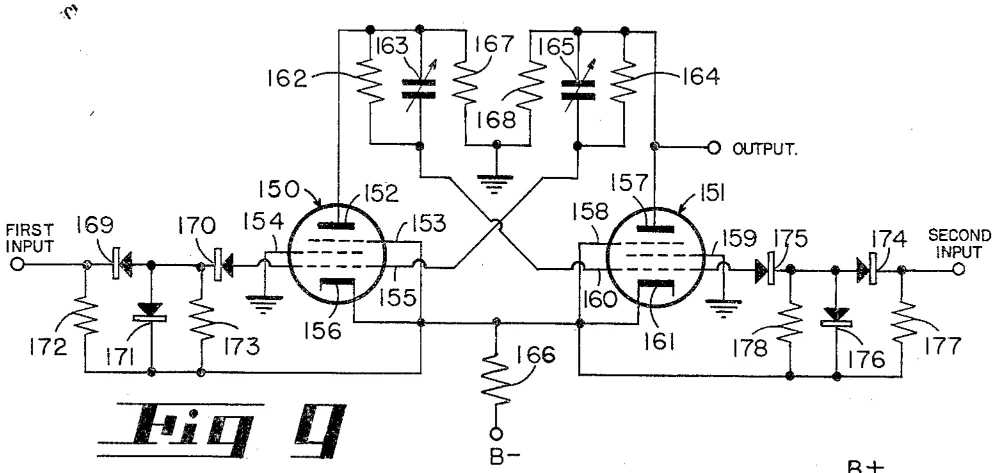
FIG. 9 is a schematic diagram illustrating the flip-flop circuits used in the compressor and expander units.

Repeated operation of the switch 38a will cause the tape to start and stop as described above, as well as connect and disconnect the above-mentioned voltages; however, as will be indicated in connection with FIG. 9, it will not cause any change in the state of the flip-flop 43. Consequently, the index pulse one-shot multivibrator 48 will not be fired, and the index pulse record head 10C will not again be energized with an index pulse until the flip-flop 43 is "reset" by any one of the means hereinafter to be described.

After a complete message has been recorded, low-speed playback means are provided for monitoring. These include the monitor amplifier 54 and external speaker 55 which are supplied with the audio output picked up from the tape at the record head 9C. For monitoring, the idler 4 is actuated into operating position by depressing the push button switch 56a to produce a negative pulse from the manual start pulse circuit 56. The negative pulse is then applied only to the "on" input of the idler-actuating network 41, and the tape 2 runs as described before. The tape is then stopped by means of a negative stop pulse derived from the manual stop pulse circuit 57 by depressing the push button switch 57a. This negative stop pulse is then applied to the "off" circuit of the idler-actuating network 41 and to the brake control circuit 45.

If for any reason it is desired to reset the flip-flop circuit 43 so that an additional index pulse may be applied to the tape in a subsequent recording operation, a negative pulse may be applied from the reset pulse circuit 59 to the second input circuit of flip-flop 43 by depressing the push button switch 59*a*. Although a positive pulse is produced when the flip-flop is reset, the positive clipping in the differentiator and positive clipper 46 prevents the firing of the one-shot multivibrator 47.

When it is desired to transmit a recorded message at high speed, clutch 27 is disengaged and high-speed clutch 31 is engaged. To enable rapid starting of the tape at the beginning of the recorded message when the compressor begins transmission, means have been provided for returning the tape at high speed to its initial position. These means include a ready pulse network 60 which produces a negative pulse, as indicated by the curve *g*, when the push button switch 60*a* is depressed. This negative pulse is applied simultaneously to the second input circuit of the flip-flop 43 after amplification in the buffer amplifier 61, and to the "on" input circuit of the idler-actuating network 41 through the cathode follower 62. The pulse applied to the second input of the flip-flop circuit effectively resets the flip-flop for the next recording operation (if not already reset), while the pulse applied to the "on" circuit of the idler-actuating network 41 causes the tape to run at the high rate of speed. The tape will continue to run until the index pulse (curve *f*) applied at the beginning of the recorded message passes under the index pulse recognition head 5C, after which it is amplified in pulse amplifier 63 and differentiated and fed through a cathode follower 64 to produce the negative pulse indicated in curve *h*. This negative pulse is then applied to the "off" input circuit of the idler-actuating network 41 and to the brake control circuit 45 to stop the tape in the same manner as previously described. At this point the compressor unit is now ready for transmitting a compressed message; i.e., the tape is now positioned so that the message will play out from the beginning and at proper speed, once the transmission is started.

This system includes automatic as well as manual means for transmitting a message at high speed. For manual transmission a continuous communication path must always be available. Thus, the manual system is useful in ordinary radio or telephone communications systems, but is not useful for meteor transmission. For manual transmission there is provided a transmit pulse network 65 which produces a negative pulse (as indicated by the curve *i*) when the push button switch 65*a* is depressed. This negative pulse is applied to a sync pulse one-shot multivibrator 66 to produce a pulse as indicated by the curve *j* in FIG. 4 which, after being passed through a cathode follower 67, is transmitted (by conventional apparatus not shown) to the expander unit to synchronize the operation of the expander with the compressor in a manner which will hereinafter be described. The output from the one-shot multivibrator 66 is also applied to a differentiator and positive clipper 68 to produce a negative pulse which, after amplification in a buffer amplifier 69 and in the cathode follower 62, is applied, as before, to the "on" input of the idler-actuating network 41 to drive the tape at the high speed. The recorded message is picked up in the high-speed playback head 7C and, after amplification in a playback amplifier 70, is transmitted to the expander unit for high-speed recording.

The tape 2 runs, and message transmission continues at high speed until the index pulse recorded on the tape at the beginning of the message is again detected at the index pulse recognition head 5C. After amplification in amplifier 63, the index pulse is again applied to the "off" circuit of the idler-actuating network 41 and to the brake control circuit 45 to stop the tape.

For automatic operation, i.e., for operation only when a meteor path is established between two stations, each station continuously transmits a sync signal and has its own receiver tuned to the other station's transmitter. When a transmission path is established, each station receives the other's signal to produce a "start" pulse. When the transmission path is broken, "stop" pulses are then produced. To start high-speed transmission from the compressor units, the "start" pulse is applied to the sync one-shot multivibrator 66 in parallel with the transmit pulse network 65. Similarly, to stop operation when the transmission path is broken, the "stop" pulse from the receiver may be coupled to the output of the cathode follower 44 in parallel with the "stop" pulse network 57. During automatic operation the cathode follower 67 may be disconnected, since the expander operation is synchronized by the continuously transmitted sync signals.

Figure 5:
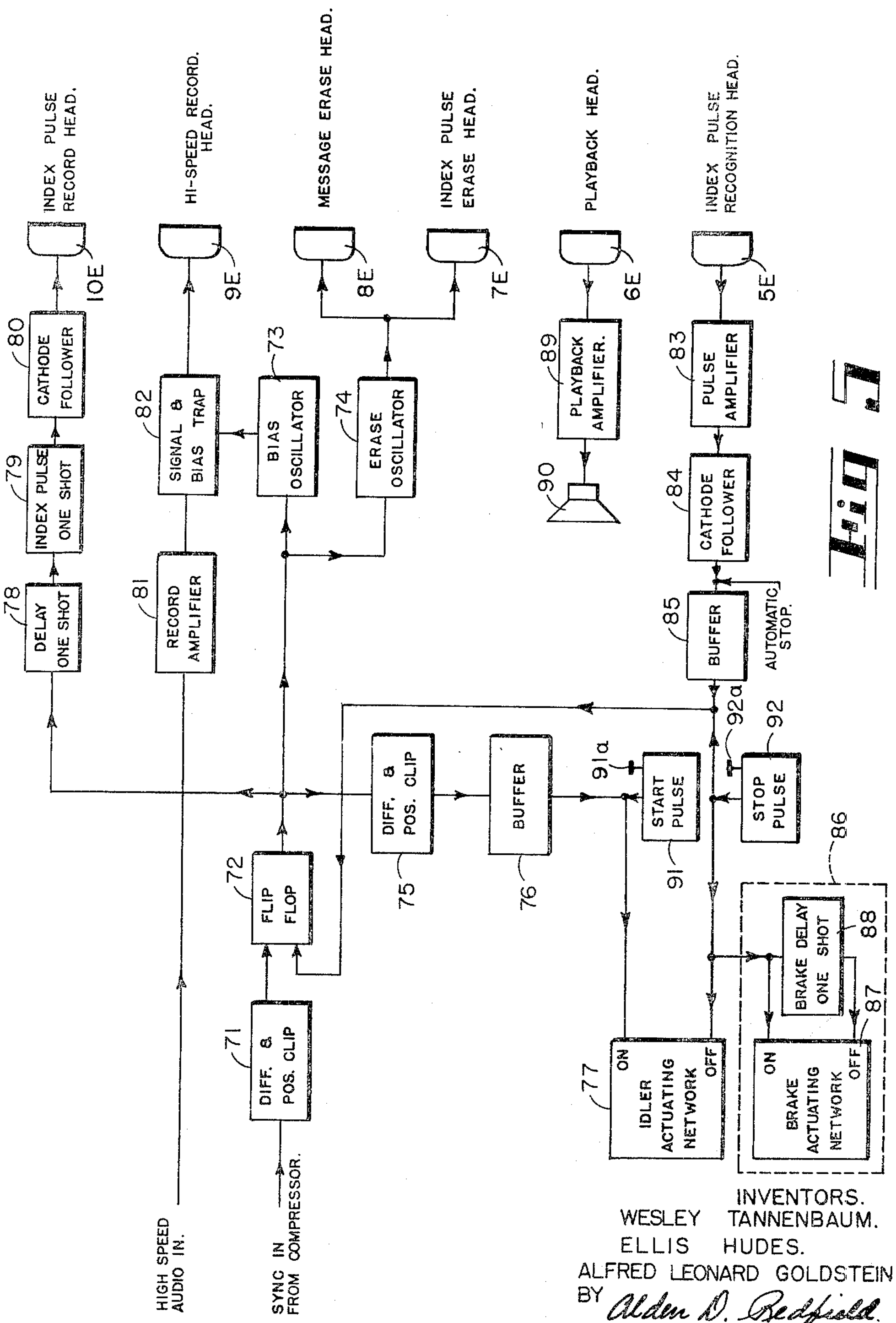
FIG. 5 is a block diagram of the electronic components of the expander unit.

The expander unit is illustrated in FIG. 5 and, as in the compressor unit, it employs six magnetic heads, an index recognition head 5E, a low-speed playback head 6E, an index pulse erase head 7E, a message erase head 8E, a high-speed record head 9E, and an index pulse record head 10E, mounted in the order stated from left to right on the panel of the expander unit. The arrangement and operation of the electronic control circuits for the expander unit are most clearly illustrated in the block diagram in FIG. 5 and in the associated curves in FIG. 6.

The high-speed recording operation is always started automatically. A transmitted sync pulse from the compressor is received at the expander receiver (not illustrated) in the wave-form indicated by the curve *a* in FIG. 6, and is applied to a differentiator and positive clipper 71. The resulting negative pulse (curve *b*) is then applied to the first input of a flip-flop 72, thereby causing it to change state. The output of flip-flop 72 is used simultaneously to control three operations to condition the expander unit for the recording of audio messages which immediately follow the sync pulse.

First, the flip-flop 72 provides a negative voltage (curve *c*) for gating the bias oscillator 73 and the erase oscillator 74 into operation. This arrangement is considered highly advantageous, since use of oscillators which operate only during reception of messages effects a considerable power savings. Moreover, as will be later explained, a considerable saving in power is also effected by use of a separate bias oscillator 73 and an erase oscillator 74. (The circuitry of the gated oscillators 73 and 74 is described in connection with FIG. 10.)

Second, the output of flip-flop 72 is applied to a differentiator and positive clipper 75, the resulting pulse (curve *f*) then being applied through buffer amplifier 76 to the "on" circuit of the idler-actuating network 77. Exactly as in the compressor, this causes the expander idler 4 to engage the expander capstan 3 and start the tape in motion.

Figure 6:
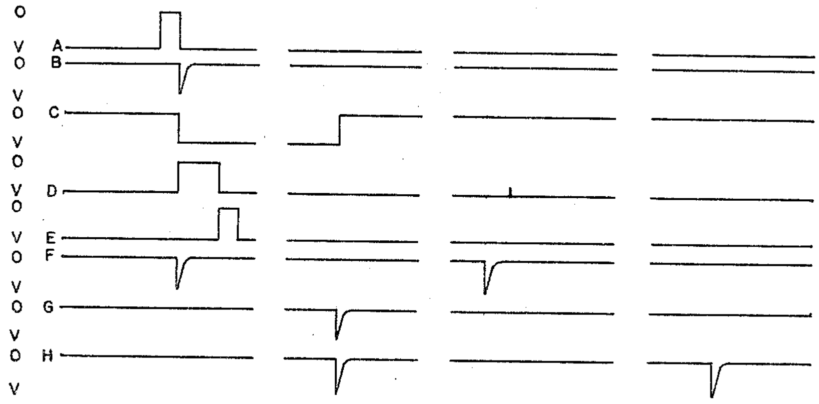
FIG. 6 is a series of curves illustrating the operation of the various components of the expander unit.

Third, the output of the flip-flop circuit 72 is also applied to the delay one-shot multivibrator 78 for producing a pulse having the waveform illustrated by the curve *d* in FIG. 6, and having a duration which is equal to the period required for the complete acceleration of the tape. This permits the tape to be running at the proper speed before the fall in voltage of the one-shot multivibrator 78 triggers a following index pulse one-shot multivibrator 79. The output of the multivibrator 79 consists of a pulse having the wave-form indicated by the curve *e* in FIG. 6, and this pulse is fed through the cathode follower 80 and applied to the index pulse record head 10E for recording on the magnetic tape.

Figure 11:
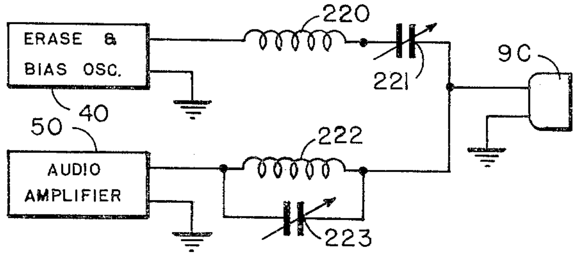
FIG. 11 is a schematic diagram of the signal and bias traps used in accordance with our invention.

The audio message which immediately follows the sync pulse is amplified in a record amplifier 81 and is added in the signal and bias trap circuit 82 with the output from the bias oscillator 73 for recording on the tape at the high speed record head 9E. The signal and bias trap 51 of the compressor, and the signal and bias trap 82 of the expander are identical in operation, and are illustrated in detail in FIG. 11.

The tape will now run at high speed, and the high-speed record head 9E will record the audio message on the tape 2 until such time as the index pulse recognition head 5E detects the recorded index pulse at the beginning of the message. A detected index pulse is amplified in a pulse amplifier 83, a cathode follower 84 and a buffer amplifier 85, and is then applied simultaneously to (1) the "off" circuit of the idler-actuating network 77, (2) a brake control circuit 86 and (3) the second input of the flip-flop 72.

When applied to the "off" circuit of the idler-actuating network 77, the negative pulse serves to de-activate the idler solenoid 36 and disengage the idle 4 from the capstan 3 of the expander. When applied to the brake control circuit 86, the negative pulse serves simultaneously to pulse the "on" input circuit of the brake-actuating network 87 and to fire the brake delay one-shot multivibrator 88, thereby activating the brake solenoid 37 and applying the brake 11 to the tape 2 for the duration of the square ware output of the one-shot multivibrator 88, at the end of which the resulting pulse produced by the voltage drop is applied to the "off" circuit of the brake-actuating network 87, thereby de-activating the brake solenoid 37 and releasing the brake 11. When applied to the second input of the flip-flop 72, the negative pulse serves to change the flip-flop 72 back to its original state, cutting (or gating) off the oscillators 73 and 74, respectively.

Thus, the detected pulse at the index pulse recognition head 5E serves (1) to release the expander idler 4 from the capstan 3, (2) to momentarily apply the expander brake 11 to the tape and (3) to cut off the bias and erase oscillators 73 and 74 and to reset the flip-flop 72 for a subsequent recording operation.

To play back a recorded message, the high-speed clutch 31 is disengaged, the low-speed clutch 27 is engaged, and the playback amplifier 89 and the external speaker 90 are energized by means of appropriate circuitry. When the push button switch **91*a* in the start pulse circuit 91 is depressed, a negative pulse is applied to the "on" circuit of the idler-actuating network 77, and the tape 2 is driven at the selected low speed. Recorded messages on the tape will be played back through the playback head 6E and through the amplifier 89 and the speaker 90, and the tape will continue to run until it is desired to stop the playback. To accomplish this the push button switch 92*a* of the stop pulse circuit 92 may be depressed to produce a negative pulse which is applied to the "off" circuit of the idler actuating network 77, the brake control circuit 86 and the flip-flop 72**, thereby stopping the tape.

The pulse circuits 38, 56, 57, 59, 60, and 65 in the compressor unit and the pulse circuits 91 and 92 in the expander unit comprise essentially a pulse-shaping network and a differentiator and positive clipper network conected in circuit with a push button switch and a source of negative potential. The schematic diagram in FIG. 7 illustrates the arrangement of the pulse circuits as used in the record pulse network 38 which comprises two substantially identical circuits **100*a* and 100*b*. Either circuit 100*a* or circuit 100*b***, along with its associated push button switch, is representative of the remaining push button circuits which, for the sake of conciseness, will not be separately described.

It will be recalled that the record pulse network 38 requires an "on" pulse for starting a recording or transmitting operation and an "off" pulse for stopping the operation; the circuit **100*a* has been provided for producing an "on" input for the idler-actuating network 41, and the circuit 100*b* has been provided for producing an "off" input pulse. Each of the circuits 100*a* and 100*b* comprises a source of negative potential V connected through resistor 101 to an R–C network comprising the condenser 102 connected in series with a parallel-connected resistor 103 and a condenser 104, and with a condenser 105 and a resistor 106. A diode rectifier 107 is connected across the resistor 106 for the purpose of clipping positive pulses, and the resistor 108 is connected across the condenser 105 and the resistor 106. The condenser 109 and the resistor 101** provide an alternating current decoupling network for the negative voltage source V.

The push button switch **38*a*, in conjunction with its associated terminals 110 and 111, selectively provides a short-circuiting path across the condenser 102 in either the "on" circuit 100*a* or in the "off" circuit 100*b*. In the "off" position the push button switch 38*a* is normally spring-biased to contact the terminals 111; to start operation, the push button is depressed to contact the terminals 110. It is apparent that in push button circuits, such as the ready pulse network 60, the reset pulse network 59, etc., only the terminals 110 are required and the terminals 111** are not used.

It also is recalled that depression of the switch **38*a* in the record pulse network 38 renders the gate relay 39 operative for the purpose of connecting the B+ supply to the bias and erase oscillator 40. The gate relay 39 may include a relay 112 connected in circuit with the negative potential source V through the terminals 110**.

Before the push button **38*a* is depressed, the entire voltage drop in the "on" circuit appears across the condenser 102, and the circuit to the relay 112 is open. When the switch 38*a* is depressed, the terminals 110 are closed, thereby energizing the relay 112 and closing its associated contacts to connect the B+ supply to the bias and erase oscillator 40. In addition, the condenser 102 is short-circuited, thereby instantaneously applying a negative voltage across the resistors 103 and 106. As in the usual differentiator network, the condenser 105 will charge at an exponential rate and the voltage across the resistor 106 will fall from zero to the negative voltage, thereby producing a negative pulse. This negative pulse is then applied through the cathode follower to the "on" input circuit of the idler-actuating network 41**.

When the push button switch **38*a* is released, the terminals 110 are opened and the terminals 111 are closed, thereby short-circuiting the condenser 102 in the "off" circuit 100*b* and blocking the application of voltage to the condenser 105 in the "on" circuit 100*a*. When the condenser 102 in the "off" circuit 100*b* is short-circuited, a negative pulse is produced for application through the cathode follower 44 to the "off" input circuit of the idler-actuating network 41 and to the brake control circuit 45. At the same time the negative voltage V is disconnected from the relay 112, and the B+ supply for the bias and erase oscillator 40 is disconnected. Although the condenser 105 in the "on" circuit 100*a* discharges, the diode rectifier 107** effectively clips any positive pulse which tends to be formed.

Figure 8:
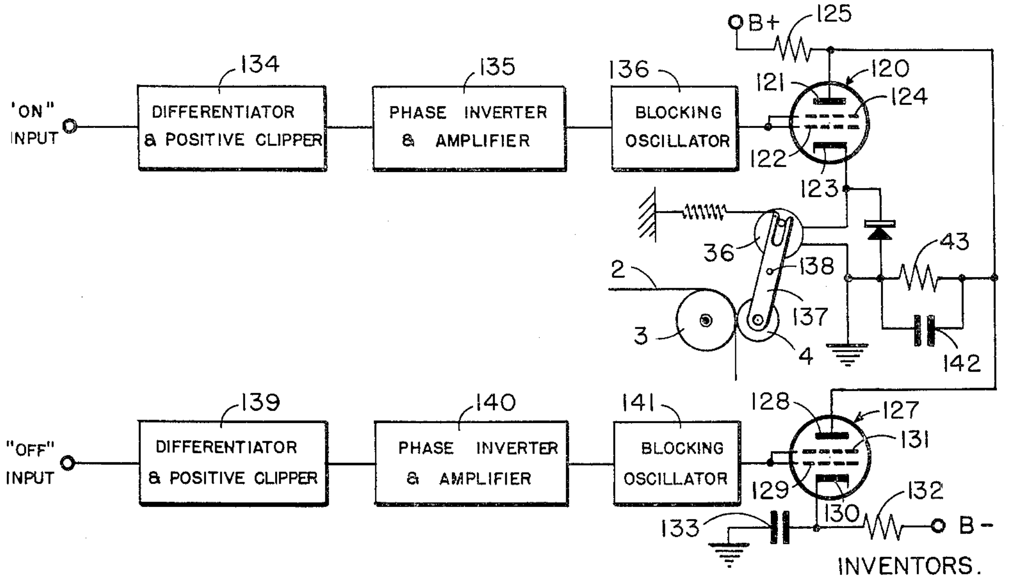
FIG. 8 is a schematic diagram representative of the brake and idler-actuating units used in the compressor and expander units.

There are four identical thyratron circuits used for controlling the operation of the idler and brake-actuating networks in both the compressor and the expander units. FIG. 8 illustrates the thyratron circuits used in the idler-actuating networks 41 and 77. It is to be understood, however, that by the substitution of the brake element 11 for the idler element 4, the same circuit may also be used for controlling the brake-actuating networks 52 and 87.

The thyratron circuits comprise an "on" thyratron 120 having a plate 121, a control grid 122, a cathode 123 and a screen grid 124. The plate 121 is connected to a B+ supply through a supply resistor 125, while the cathode 123 is connected to ground through the idler-actuating solenoid 36. The thyratron circuits also comprise an "off" thyratron 127 having a plate 128, a control grid 129, a cathode 130 and a screen grid 131. The plate 128 of thyratron 127 is connected to the plate 121 of the "on" thyratron 120, while cathode 130 is connected to a B− supply through resistor 132 and is grounded for A.-C. by means of the condenser 133.

"On" pulses derived from the associated pulse network are shaped in a differentiator and positive clipper 134 and then inverted and amplified in the phase inverter amplifier 135. The resulting positive pulse is then used to fire a blocking oscillator 136 for the purpose of obtaining a very large positive pulse which, when coupled to the control grid 122, is sufficient to ionize the "on" thyratron 120 and start conduction through the idler-actuating solenoid. Once ionized, the thyratron 120 will continue to conduct, and the solenoid 36 will be energized until the voltage of the plate 121 is reduced below cutoff.

The solenoid 36 is mechanically coupled to the idler lever arm 137 which is mounted for rotation about a pivot 138. The idler lever arm 137 is normally spring-biased so that the idler 4 does not contact the capstan 3; however, when the solenoid 36 is energized, the idler lever arm 137 is rotated about the pivot 138 so that the idler 4 engages the capstan 3, sandwiching the magnetic tape 2 therebetween. As was previously explained, the capstan is continuously rotating, and the magnetic tape 2 will be driven at a pre-selected speed when the idler 4 is moved into the operating position. The solenoid 36 will remian energized and the idler 4 will remain engaged with the capstan 3 until the plate voltage of the thyratron 120 is reduced below cutoff.

The "off" pulses derived from associated pulse networks are similarly shaped in a differentiator and positive clipper 139 and inverted in the phase inverter and amplifier 140. The output of the phase inverter and amplifier 140 is supplied to the blocking oscillator 141 for the purpose of producing a pulse which, when applied to the grid 129, is sufficient to ionize the "off" thyratron 127 and cause it to conduct.

Conduction of the thyratron 127 produces a large drop in voltage at the plate 128 and, since the thyratrons 120 and 127 are connected with common plates, the same large drop in voltage also results at the plate 121 of the "on" thyratron 120. This voltage is below the cutoff value of the thyratron 120 and conduction stops, thereby de-energizing the solenoid 36 and returning the idler 4 to its original disengaged position.

For the purpose of stopping conduction of the "off" thyratron 127 once the idler is disengaged, a large condenser 142 and a large parallel-connected resistor 143 are connected between plates 121 and 128 and ground. While the thyratron 127 is non-conductive, the condenser 142 is charged to the plate voltage of the thyratron 120. Shortly after the thyratron 127 ionizes, the conduction through that thyratron caused by the discharge of the condenser 142 will cause the voltage across the resistor 132 to rise in an amount sufficient to make the cathode 130 positive with respect to the plate 128 and thus will cut off the thyratron 127. The diode 144 is connected across the windings of the solenoid 36 for the purpose of preventing negative transients which arise when current is shut off through the solenoid 36, from keeping the thyratron 120 from shutting off.

Flip-flop circuit 43 is provided in the compressor unit for the purpose of furnishing an index pulse at the index pulse record head 10C, and flip-flop circuit 72 is provided in the expander unit for the purpose of gating the bias and erase oscillators 73 and 74 and for producing an index pulse at the index pulse record head 10E. The flip-flop circuits 43 and 72 are identical and are illustrated in FIG. 9, to which reference is now made.

The flip-flop circuits comprise two pentodes 150 and 151, the pentode 150 having a plate 152, a suppressor grid 153, a screen grid 154, a control grid 155 and a cathode 156, and the pentode 151 having a plate 157, a suppressor grid 158, a screen grid 159, a control grid 160 and a cathode 161. As in conventional flip-flop cirsuits, the plate 152 of the pentode 150 is coupled to the control grid 160 of the pentode 151 through parallel-connected resistor 162 and variable condenser 163. Similarly, plate 157 of the pentode 151 is coupled to the control grid 155 of the pentode 150 through parallel-connected resistor 164 and variable condenser 165. The cathodes 156 and 161 are connected to a B− supply through resistor 166, and the plates 152 and 157 are connected to ground through resistors 167 and 168, respectively.

As will be recalled, each of the flip-flops 43 and 72 require two input circuits for changing the state of its output. The first input circuit is located between the control grid 155 and the cathode 156, and it includes a shaping and positive clipping network comprising diodes 169, 170 and 171 and the resistors 172 and 173. Similarly, the second input is located between the control grid 160 and the cathode 161, and it includes a shaping and positive clipping network comprising the diodes 174, 175 and 176 and the resistors 177 and 178.

As used in the compressor unit, the flip-flop circuit is arranged so that in its first state, i.e., its condition when the recorder is not operating, a negative pulse has been applied to the second input circuit, and the pentode 151 has been rendered non-conductive and the pentode 150 conductive, thereby producing a positive step voltage at the plate 157. When push button switch 38*a* in the record pulse network 38 is depressed, the negative pulse produced is applied to the first input circuit of the flip-flop 43, thereby rendering the pentode 150 non-conductive and the pentode 151 conductive and producing a drop in output voltage at the plate 157. This drop in output voltage is differentiated and then used to fire the one-shot multivibrators 47 and 48. If the switch 38*a* is released, the small positive pulse produced will be shunted by the diode 171 and will be insufficient to change the state of the flip-flop. If the switch 38*a* is again depressed, the negative pulse produced by the record pulse network 38 will have no effect on the pentode 150, since it is already non-conductive. Therefore, repeated starting and stopping of the operations during the recording of a single message will cause the application of only one index pulse at the index pulse record head 10C.

When, however, it is desired to reset the flip-flop for starting a recording operation, or when it is desired to reset the flip-flop for starting a transmission, a negative pulse may be produced at the second input circuit by depressing push button switch 59*a* or push button switch 60*a*. Application of a negative pulse to the second input circuit cuts off the pentode 151 and renders the pentode 150 conductive. Although the increase in voltage from the output of the flip-flop is differentiated, no positive pulse is produced because of the positive clipping provided in the differentiator and positive clipper 46.

As used in the expander circuit, the flip-flop circuit 72 is arranged so that in its initial state, i.e., when the expander is not recording, a negative pulse has been applied (from either the index pulse recognition head 5E or from the stop pulse network 92) to the second input circuit. Thus, the pentode 150 is conductive and the pentode 151 is non-conductive, thereby producing a positive step output voltage at the plate 157. As will be seen from the discussion of the gated oscillator circuits illustrated in FIG. 11, the bias and erase oscillators 73 and 74 will be gated off under this condition. When, however, the negative sync signal transmitted from the compressor is received at the expander and applied to the differentiator and positive clipper 71, a negative pulse will then be applied to the first input circuit of the flip-flop, thereby producing a decrease in voltage for gating on the bias and erase oscillators 73 and 74. In addition, a negative pulse is produced for firing the one-shot multivibrators 78 and 79 and for activating the idler-actuating network 77.

As was noted in the description of the expander unit (FIG. 5), a separate bias oscillator 73 and a separate erase oscillator 74 have been provided. In the prior art recorders the bias and erase oscillators usually comprised a single oscillator having two outputs at the same frequency. Experience has indicated that bias frequencies of at least four times the highest recording frequency are required, and in conventional speed recorders this frequency is also suitable for erasing. The reason the erase frequency is usually at least as high as the bias frequency is because it is desirable to erase without leaving the erase frequency as a residue. However, in our expander, recording speeds up to one hundred fifty times the normal recording speed are required, and the recorded frequencies are multiplied by that amount. Therefore, for biasing we require frequencies of 2 megacycles, and ordinarily, the same frequencies would be used for erasing; however, erasing at these frequencies requires excessive amounts of power. This is due to the fact that it is necessary to erase a band of frequencies from very low (10 kc.) to very high (450 kc.).

It appears that the depth of recording of the signal into the oxide of the tape is inversely proportional to the recording frequency. That is, the lower the frequency, the greater the recording depth. In order to erase, it is necessary for the erase frequency to penetrate and "saturate record" its signal to at least the same depth as the recorded signal. This greater depth of the high frequency is usually obtained by increasing the erase power to compensate for its increase in frequency. This increase in necessary power is a very non-linear function as the erase frequencies become high, and in our case, the power to obtain erasure of 10 kc. with a 2 megacycle erase signal would be prohibitive. However, by using a frequency only slightly above the highest recorded frequency, erasure of all signals is mose easily obtained. However, under these conditions, the erase signal will remain as a residue and a sharp cut-off of playout band width is necessary to eliminate this "high frequency" residue. If, however, two erasure passes of the tape over the erase head, or two erase heads, one following the other, or a double gapped erase head are used, then the resultant will be "virgin tape." This is due to the fact that the second erasure will in effect add at a random phase to the residue of the first erase signal, thus cancelling both signals out.

Thus we have found that by providing the separate bias oscillator 73 operating at a high frequency and the erase oscillator 74 operating at a much lower frequency, we get complete erasure with considerable power savings.

In order to additionally conserve power during periods when the expander is not recording or playing back, we provide a novel arrangement whereby the oscillators operate only when the tape is running and the expander is actually recording at high speed. To start expander operation, the sync input from the compressor unit is applied to the differentiator and positive clipper 71 and then to the flip-flop circuit 72 which is caused to change state. The negative output voltage from the flip-flop is then used for gating both the bias oscillator 73 and the erase oscillator 74.

Figure 10:
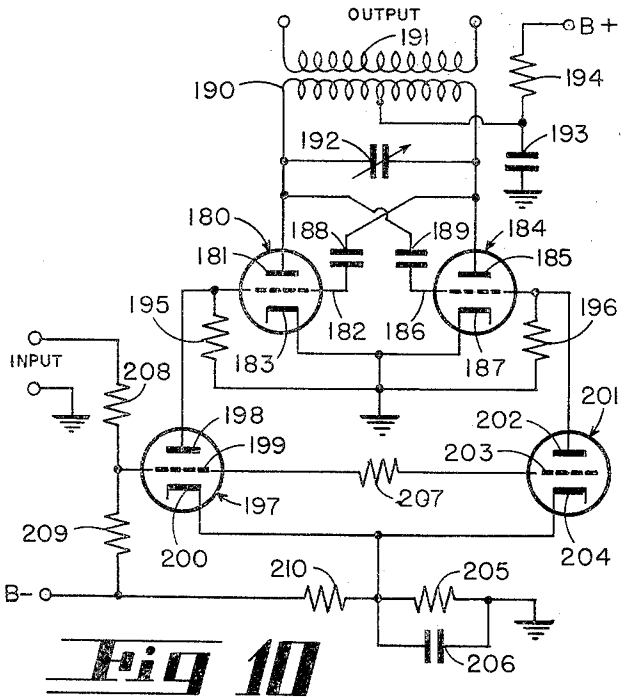
FIG. 10 is a schematic diagram illustrating the gated oscillators used in accordance with our invention.

FIG. 10, to which reference is now made, represents the substantially identical bias and erase oscillators 73 and 74, each of which is essentially a push-pull oscillator comprising a triode 180 having a plate 181, a control grid 182 and a cathode 183, and a triode 184 having a plate 185, a control grid 186 and a cathode 187. In a conventional manner the plate 181 of triode 180 is capacitively coupled by means of a condenser 188 to the control grid 186 of triode 184. Similarly, the plate 185 is capacitively coupled to the control grid 182 by means of a condenser 189. The oscillator output circuit includes a transformer primary winding 190 and a secondary winding 191, the primary winding being connected between the plates 181 and 185 and being tuned to the desired frequency by means of a variable tuning condenser 192. The condenser 193 and the resistor 194 provide decoupling of the oscillator from the B+ supply. Resistors 195 and 196 are provided in the grid-cathode circuit of the triodes 180 and 184, respectively, to supply direct current returns for the grid circuits and, in conjunction with condensers 188 and 189, to control the feedback voltages from the opposite plates.

For the purpose of conserving power during non-operating periods, the oscillator is maintained inoperative by means of a gating network comprising the triode 197 having a plate 198, a control grid 199 and a cathode 200, and a triode 201 having a plate 202, a control grid 203 and a cathode 204. The plates 198 and 202 are connected directly to the grids 182 and 186, respectively; and, therefore, the potential at the plates 198 and 202 will determine whether or not triodes 180 and 184, respectively, will be conductive. The cathodes 200 and 204 are connected to ground through resistor 205 which is by-passed for A.-C. by condenser 206. The grids 199 and 203 are connected together through a small resistor 207 and are coupled to the output of the flip-flop circuit 72 by means of a resistor 208. The triodes are provided with bias and operating potential from a B— supply connected to the grids through a large grid-biasing resistor 209 and to the cathodes through a relatively smaller resistor 210.

If the triodes 197 and 201 are conducting, the voltage at the plates 198 and 202 will be quite negative with respect to ground; thus, the voltage at the grids 182 and 186 will be below the cutoff value of the triodes 180 and 184, respectively, and neither tube will conduct. However, when the output from the flip-flop circuit 72 changes state, a negative voltage will be applied to the grids 199 and 203, thereby cutting off conduction of the triodes 197 and 201, respectively. This results in a large increase in voltage at the plates 198 and 202 (back to zero or ground) which is applied directly to the grids 182 and 186, respectively. The increase in voltage at the grids 182 and 186 is sufficient to render both triodes 180 and 184 conductive, and oscillations will commence.

In the description of the compressor unit it was pointed out that, for applying a recording signal to the record head 9C, the output from the erase and bias oscillator 40 is added in the signal and bias trap 51 with the output of the audio amplifier 50. Similarly, in the description of the expander unit it was pointed out that for applying a recording signal to the high-speed record head 9E, the output from the bias oscillator 73 is added in the signal and bias trap 82 with the output from the record amplifier 81. The signal and bias traps 51 and 82 are identical in mode of operation and will be explained in connection with the portion of the compressor unit illustrated in FIG. 11, to which reference is now made.

The signal and bias traps include a series trap comprising series-connected inductor 220 and condenser 221, and a parallel trap comprising parallel-connected inductor 222 and condenser 223. In the compressor the series trap is connected in the output of the erase and bias oscillator 40, and the parallel trap is connected in circuit with the output of the audio amplifier 50. Both traps are tuned to the output frequency of the erase and bias oscillator 40, and their added outputs are applied to the magnetic head 9C for recording. In actual practice the frequency of the erase and bias oscillator is about 20 kc., while the output from the audio amplifier 50 is at an audio frequency of from approximately 100 c.p.s. to 4 kc.

Use of the parallel trap in the output of the audio amplifier 50 provides a very low impedance for audio signals and a very high impedance for oscillator frequencies. On the other hand, the series trap provides a very low impedance for the oscillator frequencies while it provides a very high impedance for the audio amplifier frequencies. In this way the erase and bias oscillator 40 is isolated from the audio amplifier 50 by the series trap, and the parallel trap effectively prevents the grounding of the erase and bias oscillator 40 through the output circuit of the record amplifier.

As is well known in the magnetic recording art, it is desirable to employ apparatus which will yield a flat gain-versus-frequency response from the magnetic playback head. It is also known that for a given magnetic head, audio frequency range and tape speed, the input signals to the head must follow a gain-versus-frequency response curve approximating an exponential in order that the output be flat. The expontential curve is, of course, almost flat at the low frequencies and becomes very steep at the higher frequencies. In the prior art systems, much higher recording speeds are employed and, thus, for a given audio range a flat response may be obtained by working in the substantially flat portion of the curve. In our system, however, our recording speeds are as low as 1.67" per second, and we must work in the steep portion of the curve, since more power is required for playing back higher frequencies recorded at low speed. In order to produce the same flat response we provide record amplifiers 50 and 81 in the compressor and expander units, respectively.

Figure 12:
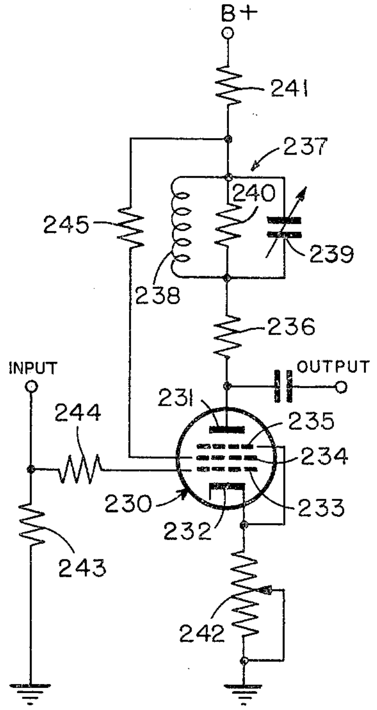
FIG. 12 is a schematic diagram illustrating the record amplifier used in both the compressor and the expander units for the purpose of providing gain compensation.

As shown in FIG. 12, each of the amplifiers 50 and 81 comprises a pentode 230 having a plate 231, a cathode 232, a control grid 233, a screen grid 234 and a suppressor grid 235. The plate 231 is connected to a B+ supply through a resistor 236, a resonant parallel tank circuit 237 comprising inductor 238, variable condenser 239 and resistor 240, and a supply resistor 241. The cathode 232 is connected to ground through a variable bias potentiometer 242, and input signals are coupled across the cathode 232 and grid 233 by means of resistors 243 and 244. The suppressor grid 235 is directly coupled to the cathode 232 and the screen grid 234 is connected to the B+ supply through a resistor 245 in a conventional manner.

For providing the proper input to the playback head 7C in the compressor, or to the record head 9E in the expander, the tank circuit 237 is tuned to the higher ranges of frequencies applied; in the compressor this frequency is the highest range of audio; in the expander this frequency is the highest range of audio times the compression ratio. In this way, the voltage gain across the pentode 230 is reduced at freqeuncies off resonance in amounts necessary to produce a curve approximating that required for the input to the magnetic heads and, thus, we are able to operate our system at very high speeds and still maintain a substantially constant gain and achieve good fidelity.

While we do not intend to be limited to specific circuit values, the circuits illustrated in FIGS. 7–12 employ the following parameters:

| | | |
|---|---|---|
| Resistor **101** | ohms | 47K |
| Condenser **102** | μf | .1 |
| Resistor **103** | ohms | 47K |
| Condenser **104** | μf | .001 |
| Condenser **105** | μf | 220 |
| Resistor **106** | ohms | 47K |
| Diode **107** | | Type IN34 |
| Resistor **108** | ohms | 220K |
| Condenser **109** | μf | .1 |
| Thyratron **120** | | Type 2D21 |
| Resistor **125** | ohms | 3K |
| Thyratron **127** | | Type 2D21 |
| Resistor **132** | ohms | 10K |
| Condenser **133** | μf | 80 |
| Condenser **142** | μf | 10 |
| Resistor **143** | megohms | 4.7 |
| Pentode **150** | | Type 6CL6 |
| Pentode **151** | | Type 6CL6 |
| Resistor **162** | ohms | 47K |
| Condenser **163** | μμf | 8–50 |
| Resistor **164** | ohms | 47K |
| Condenser **165** | μμf | 8–50 |
| Resistor **166** | ohms | 1500 |
| Resistor **167** | do | 2200 |
| Resistor **168** | do | 2200 |
| Diode **169** | | Type 6006 |
| Diode **170** | | Type 6006 |
| Diode **171** | | Type 2051 |
| Resistor **172** | ohms | 68K |
| Resistor **173** | do | 68K |
| Diode **174** | | Type 6006 |
| Diode **175** | | Type 6006 |
| Diode **176** | | Type 2051 |
| Resistor **177** | ohms | 68K |
| Resistor **178** | ohms | 68K |
| Triode **180** | | ½ of Type 5687 |
| Triode **184** | | ½ of Type 5687 |
| Condenser **188** | μμf | 10 |
| Condenser **189** | do | 10 |
| Transformer Primary Windings | μh | 124 |
| Condenser **192** | μμf | 8–50 |
| Condenser **193** | μf | .05 |
| Resistor **194** | ohms | 100 |
| Resistor **195** | do | 100K |
| Resistor **196** | do | 100K |
| Triode **197** | | ½ of Type 12AT7 |
| Triode **201** | | ½ of Type 12AT7 |
| Resistor **205** | ohms | 8.2K |
| Condenser **206** | μf | .01 |
| Resistor **207** | ohms | 100 |
| Resistor **208** | do | 75K |
| Resistor **209** | do | 22K |
| Resistor **210** | do | 2.2K |
| Inductor **220** | μh | 100 |
| Condenser **221** | μμf | 20–125 |
| Inductor **222** | μh | 250 |
| Condenser **223** | μμf | 8–50 |
| Pentode **230** | | Type 12BY7A |
| Resistor **236** | ohms | 470 |
| Inductor **238** | millihenrys | 2.5 |
| Condenser **239** | μf | 8–50 |
| Resistor **240** | ohms | 82K |
| Resistor **241** | do | 4K |
| Potentiometer **242** | do | 180–2180K |
| Resistor **243** | do | 820 |
| Resistor **244** | do | 100 |
| Resistor **245** | do | 33K |

Having thus described our invention, we claim:

1. A magnetic tape recorder comprising: magnetic recording and erase heads and an endless magnetic tape; means for selectively driving said tape across said magnetic heads at a low speed and at a high speed in one direction, said driving means including a high-speed motor and a low-speed motor and a capstan; means selectively coupling said high-speed or said low-speed motor to said capstan, whereby said capstan is continuously rotated at either the high speed or the low speed; means for frictionally engaging said capstan with said tape; means for simultaneously disengaging said capstan from said tape and momentarily applied means for stopping motion of said tape; and means for removing and preventing the accumulation of static electricity on said tape.

2. The invention as defined in claim 1 wherein said means for frictionally engaging said capstan with said tape comprises a freely rotatable idler wheel mounted adjacent said tape and said capstan, and means for moving said idler wheel against said capstan and sandwiching said tape therebetween.

3. The invention as defined in claim 1 wherein excess tape is stored in a bin mounted below said heads.

4. The invention as defined in claim 3 wherein said means for removing and preventing the accumulation of static electricity on said tape comprises metallic pressure pads, and wherein means are provided for biasing said pads against said tape and said heads for maintaining said tape and said heads in close proximity.

5. A magnetic recorder comprising: a plurality of magnetic heads fixedly aligned on a panel; a series of guides mounted adjacent said heads; an endless magnetic tape threaded between said guides and said heads; means for driving said tape past said heads for recording and for playback; a plurality of conductive pads, means for maintaining said pads firmly against said tape at each of said heads for keeping said tape in close proximity to said heads and for removing and preventing the accumulation of static electricity during recording and playback.

6. A magnetic tape recorder; driving means for said magnetic tape; braking means for said tape; means for energizing said driving means to drive said tape at a selected speed; and means for instantaneously stopping said tape, including means for simultaneously de-energizing said driving means and means for momentarily actuating said braking means.

7. The invention as defined in claim 6 wherein said driving means includes a rotating capstan and a solenoid-actuated idler wheel, said tape being positioned therebetween; and means for energizing said solenoid to frictionally engage said tape with said capstan.

8. The invention as defined in claim 7 wherein said means for energizing said solenoid comprise: a first thyratron and a second thyratron, each of said thyratrons having a plate, a cathode and a control grid, said plates being connected together and to a source of operating potential, said solenoid being connected in series with said cathode and plate of said first thyratron and said source; means for producing a first large positive pulse; means for applying said pulse to the grid of said first thyratron, thereby causing said thyratron to conduct and energizing said solenoid; means for producing a second large positive pulse; means for applying said second large positive pulse to said grid of said second thyratron, thereby causing said second thyratron to conduct, whereby the reduced potential at the plate of said second thyratron will cause a reduction in plate voltage of said first thyratron sufficient to cut off said first thyratron; and means connected in circuit with said cathode and plate of said second thyratron for cutting off said second thyratron after said first thyratron cuts off.

9. The invention as defined in claim 7 wherein said braking means is momentarily actuated by a solenoid and wherein are provided means for momentarily energizing said solenoid, said energizing means comprising: a first thyratron and a second thyratron, each of said thyratrons having a plate, a cathode and a control grid, said plates being connected together and to a source of operating potential, said solenoid being connected in series with said cathode and said plate of said first thyratron and said source; a one-shot multivibrator for producing at its output a delay pulse having a duration equal to the required braking time when fired by a pulse supplied at its input circuit; means for simultaneously applying a first pulse to the input of said one-shot multivibrator for producing said delay pulse and to the grid of said first thyratron for causing conduction of said thyratron and thereby energizing said solenoid; means at the termination of said delay pulse for producing a second pulse; means for applying said second pulse to the grid of said second thyratron, thereby causing said second thyratron to conduct, whereby the reduced potential at the plate of said second thyratron will cause a reduction in plate voltage of said first thyratron sufficient to cut off said first thyratron; and means connected in circuit with said cathode and plate of said second thyratron for cutting off said second thyratron after said first thyratron cuts off.

10. A multi-station communication system including: a transmitter and a receiver at each station; a first unit associated with each transmitter for magnetically recording speech at a high speed and for playing back said speech at a low speed; said first unit comprising a magnetic recorder having at least a magnetic speech record head, a magnetic playback head and an endless magnetic tape; means for driving said tape at said low speed for recording; means for applying speech to said record head for impressing said speech on said magnetic tape; means for playing back said recorded speech at said high speed through said playback head, said means including a sync pulse; means for simultaneously transmitting said sync pulse and said played back recorded speech; the second unit at said receiver comprising a magnetic tape recorder having at least a magnetic record head, a magnetic index record head and an endless magnetic tape; a bias oscillator for biasing said record head; means for driving said magnetic tape at said high speed for recording; first means responsive to receipt of said sync pulse for rendering said bias oscillator operative; second means responsive to receipt of said synch pulse for rendering said driving means operative; and third means responsive to receipt of said sync pulse for applying an index pulse to said index record head.

11. A magnetic recorder comprising: at least an index record head, a low-speed record head, a high-speed playback head, an index recognition head and an endless magnetic tape; high-speed driving means for driving said magnetic tape across said heads, and low-speed driving means for driving said magnetic tape across said heads; a speech amplifier and a bias oscillator; means for adding the outputs of said amplifier and said oscillator and for applying said added outputs to said low-speed record head; a one-shot multivibrator; means for applying the output of said one-shot multivibrator to said index record head; a bi-stable network having a first input circuit, a second input circuit and an output circuit, the output voltage at said output circuit being in a first state when a pulse of a given polariy is applied to said first input circuit and being in a second state when a pulse of said polarity is applied to said second input circuit; means responsive to the change from said first state to said second state for firing said one-shot multivibrator to impress an index pulse on said magnetic tape; means for producing a start pulse and for applying said start pulse to the first input circuit of said bi-stable network for causing said bi-stable network to change state; and means responsive to said start pulse for starting said low-speed driving means; means responsive to an index pulse detected at said index recognition head for stopping said driving means; means for producing a transmit pulse; means responsive to said transmit pulse for producing a sync pulse for transmission; means responsive to said sync pulse for starting said high-speed driving means and for applying a pulse to the second input circuit of said bi-stable network to reset said network to its original state, whereby said tape will be driven at high speed until said index pulse is detected at said index recognition head and said tape is stopped.

12. A magnetic recorder comprising: at least an index record head, a high-speed record head, a low-speed playback head, an index recognition head and an endless magnetic tape; high-speed driving means for driving said magnetic tape across said heads, and low-speed driving means for driving said magnetic tape across said heads; a speech amplifier and a bias oscillator; means for adding the outputs of said speech amplifier and said bias oscillator and for applying said added outputs to said high-speed record head; a one-shot multivibrator; means for applying the output of said one-shot multivibrator to said index record head; a bi-stable network having a first input circuit, a second input circuit and an output circuit, the output voltage at said output circuit being in a first state when a pulse of a given polarity is applied to said first input circuit, and being in a second state when a pulse of said polarity is applied to said second input circuit; first means responsive to the change from said first state to said second state for producing an index pulse for application to said index record head; second means responsive to said change for rendering operative said bias oscillator; and third means responsive to said change for rendering operative said high-speed driving means; means responsive to detection of said index pulse at said index recognition head for simultaneously stopping said tape and for changing said bi-stable circuit from its second state to its first state; and means for driving said tape at a low speed for playback of said recorded speech through low speed playback head.

13. A magnetic tape recorder comprising an endless magnetic tape arranged for travel past an index record head, a message record head and an index recognition head; means for driving the magnetic tape past said heads in the order stated for recording; means at the start of recording for applying an index pulse to said index record head for impressing said pulse on said magnetic tape; means for applying audio signals to said record head for impressing audio messages on said tape; and means responsive to said index pulse detected on said tape by said index recognition head for automatically stopping said tape.

14. A magnetic tape recorder having at least an index record head, a message record head and an index recognition head; means for driving said magnetic tape across said magnetic heads for recording; an oscillator for biasing said record head; circuit means for starting said driving means, said circuit means including means for generating a negative pulse; relay means responsive to operation of said circuit means for biasing said oscillator into oscillation; an index pulse network coupled between said circuit means and said index record head for generating an index pulse at the beginning of a recording operation; and means for impressing said index pulse on said magnetic tape.

15. The invention as defined in claim 14 wherein said index pulse network comprises: a bi-stable circuit having a first input circuit coupled to said circuit means, a second input circuit and an output circuit, the output voltage at said output circuit being in a first state when a pulse of a given polariy is applied to said first input circuit and being in a second state when a pulse of said polarity is applied to said second input circuit; means for producing a first pulse when said output voltage changes state; means for applying said first pulse to a first one-shot multivibrator for producing a second pulse having a duration equal to the time required for the magnetic tape to accelerate from zero speed to full operating speed; means for producing a third pulse at the termination of said second pulse; means for applying said third pulse to a second one-shot multivibrator for producing said index pulse; a reset network for producing a negative pulse; and means for coupling said reset network to said second input circuit.

16. The invention as defined in claim 15 wherein means are provided for stopping means for said tape and wherein said stopping means and said reset network are automatically rendered operative when said index pulse is detected at said index recognition head.

17. A magnetic recorder comprising: a bias oscillator, a signal amplifier and a magnetic head; means for adding the output of said oscillator with the output of said amplifier and for applying said added outputs to said magnetic head; said bias oscillator comprising first and second triodes, each having a plate, a grid and a cathode, the plate of said first triode being capacitively coupled to the grid of said second triode and the plate of said second triode being capacitively coupled to the grid of said first triode; said cathodes and said plates being connected in series with a source of operating potential; a third and a fourth triode, each of said third and fourth triodes having a plate, a grid and a cathode, the plate of said third triode being connected directly to the grid of said first triode and the plate of said fourth triode being directly connected to the grid of said second triode, and said plates and said cathodes of said third and fourth triodes being connected in series with a source of operating potential; means responsive to the start of a recording operation for rendering said third and fourth triodes nonconductive; and means responsive to the end of a recording operation for rendering said third and fourth triodes conductive whereby said first and second triodes will be operative only during a recording operation.

18. A magnetic recorder comprising: a bias oscillator, a signal amplifier and a magnetic head; means for adding the output of said oscillator with the output of said amplifier, said means comprising a series-connected inductor and condenser connected in series with said oscillator and said magnetic head, and a parallel-connected inductor and condenser connected in series with said amplifier and said magnetic head, said series-connected inductor and condenser and said parallel-connected inductor and condenser both being tuned to the frequency of said oscillator.

19. In a magnetic tape recorder for recording alternating current signals, the combination including: a magnetic recording head; means for compensating said alternating current signals and for applying said compensated signals to said head, said means comprising a variable impedance voltage divider including a variable conduction device and a resonant tank circuit in series with a source of voltage; means for controlling the conductivity of said variable conduction device in response to the magnitude of said alternating current signals; and said tank circuit being tuned to a predetermined range of frequencies of said alternating current signals whereby the output from across said variable conduction device will vary in accordance with both the magnitude and the frequency of said signals.

20. In a magnetic tape recorder for recording alternating current signals, the combination including: a magnetic recording head; means for compensating said alternating current signals and for applying said compensated signals to said head, said means comprising an amplifying device having a positive electrode, a negative electrode and a control electrode; a resonant tank circuit connected in series with said positive and negative electrodes and a source of voltage, said resonant tank circuit being tuned to a predetermined range of said alternating current signals, said alternating current signals being applied between said control electrode and said negative electrode, and said compensated signals being derived from between said positive electrode and said negative electrode, whereby said compensated signals vary in accordance with both the magnitude and the frequency of said alternating current signals.

21. In a magnetic tape recorder for recording alternating current signals, the combination comprising: a magnetic recording head, first and second magnetic erase heads, and a magnetic tape; means for selectively driving said tape across said magnetic heads; an alternating current source of erase signals having a frequency slightly higher than the frequency of said alternating current signals; and means for simultaneously supplying said erase signals to each of said erase heads.

References Cited in the file of this patent

UNITED STATES PATENTS

| | | |
|---|---|---|
| 2,281,405 | Barrish et al. | Apr. 28, 1942 |
| 2,351,007 | Camras | June 13, 1944 |
| 2,410,569 | Conant | Nov. 5, 1946 |
| 2,542,506 | Gibson | Feb. 20, 1951 |
| 2,590,665 | Williams | Mar. 25, 1952 |

OTHER REFERENCES

Magnetic Recording, S. J. Begun, 1949, Murry Hill Books Inc., pp. 173–175 and 188–189.

UNITED STATES PATENT OFFICE
CERTIFICATE OF CORRECTION

Patent No. 3,027,425 March 27, 1962

Wesley Tannenbaum et al.

It is hereby certified that error appears in the above numbered patent requiring correction and that the said Letters Patent should read as corrected below.

Column 1, line 29, for "deflecting" read -- reflecting --; line 37, for "message" read -- messages --; column 2, line 4, for "deirable" read -- desirable --; column 5, line 19, for "betwen" read -- between --; column 6, line 19, strike out "the", second occurrence; column 9, line 15, for "ware" read -- wave --; line 50, for "conected" read -- connected --; column 11, line 1, after "noid" and before the period insert -- 36 --; line 15, for "remian" read -- remain --; same column 11, lines 63 and 64, for "cirsuits" read -- circuits --; column 13, line 23, for "mose" read -- most --.

Signed and sealed this 17th day of July 1962.

(SEAL)
Attest:

ERNEST W. SWIDER
Attesting Officer

DAVID L. LADD
Commissioner of Patents